(No Model.)

N. GEISEN.
WORK REST FOR WOOD TURNING LATHES.

No. 288,994. Patented Nov. 27, 1883.

Witnesses:
Chas. E. Gaylord.
L. M. Freeman.

Inventor:
N. Geisen
By L. B. Coupland & Co.
Atty.

UNITED STATES PATENT OFFICE.

NICHOLAS GEISEN, OF HANOVER CENTRE, INDIANA.

WORK-REST FOR WOOD-TURNING LATHES.

SPECIFICATION forming part of Letters Patent No. 288,994, dated November 27, 1883.

Application filed July 24, 1883. (No model.)

*To all whom it may concern:*

Be it known that I, NICHOLAS GEISEN, of Hanover Centre, county of Lake, and State of Indiana, have invented certain new and useful Improvements in Work-Rests for Wood-Turning Lathes, of which the following is a full, clear, and exact description, that will enable others to make and use the same, reference being had to the accompanying drawings, forming a part of this specification.

The improved features set forth herein are more particularly designed as an improvement on Letters Patent No. 244,925, of July 26, 1881.

This invention relates to that class of lathes used in turning wooden handles that are of an irregular form; and it consists of devices for clamping and holding the work up against the cutters, and prevents the handles being turned from springing away from the same and spoiling the work, as will be hereinafter more fully set forth in detail.

Figure 1:
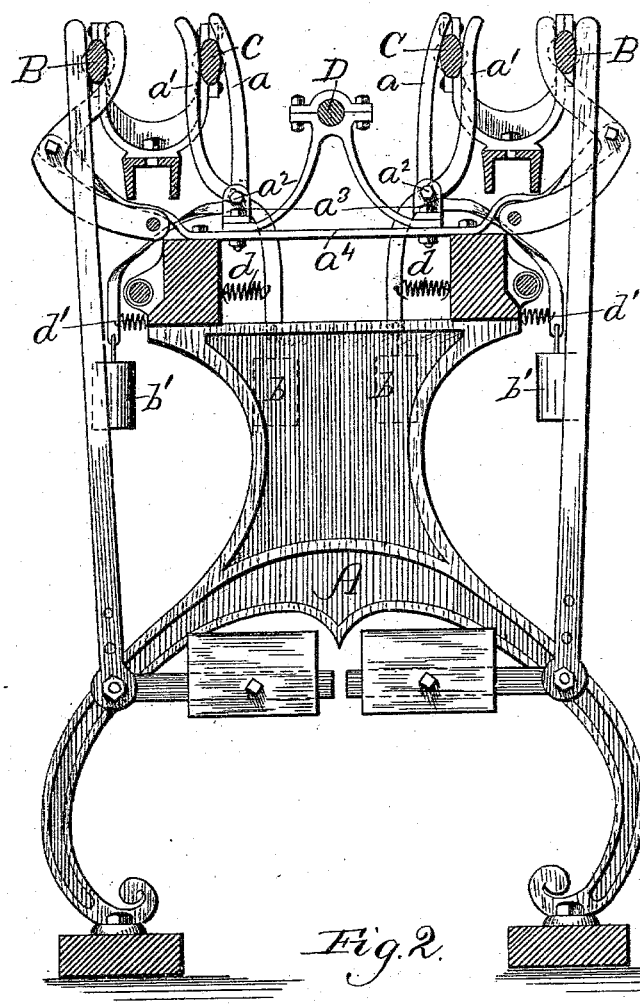
Figure 2:
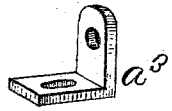

Figure 1 is a vertical transverse section of a lathe embodying my improved features, and Fig. 2 a detached detail of construction.

The objection to a lathe of this class is that in turning light handles or sticks the work will spring away from the cutters and then back, so that the work will be gouged out in a rough manner, and thus not producing a merchantable article. This objection I overcome by devices so constructed and arranged as to continuously retain the work in contact with the cutters.

Referring to the drawings, A represents the frame-work supporting the usual lathe mechanism; B, the pattern or model from which the work is copied; C, the work or handle being turned.

The lathe represented in the drawings is adapted to turn two handles at the same time, the parts being duplicated, so that the description of one will apply to both and the same reference-letters to companion parts, and the description will be confined to the improved parts. The cutter-head is supported centrally on the shaft D, the stock to be turned being placed at each side, as illustrated in the drawings.

The clamping device for holding the work consists of two angular levers, $a\ a'$, crossed and pivoted together near their longitudinal center at $a^2$, adapting the same to operate in a manner similar to that of a pair of shears. These levers are supported at their pivotal center by being attached to the vertical part of the angle-bracket $a^3$, the horizontal part of which is bolted to the cross-bar $a^4$. The handle or stock C to be turned is clamped between the upper ends of these levers, while the lower diverging ends extend below the top of the lathe, and have the weights $b\ b'$ suspended thereto, which serves to keep the jaws or upper ends of the levers tightly clamped together. The springs $d\ d'$ are used in connection with the weights for the purpose of breaking the concussion and force of the same, and preventing the same from moving toward each other too suddenly when the upper ends are separated for the removal and insertion of stock. One end of these springs is attached to a part of the lathe, while the other end is secured to the lower part of the angular clamping-levers. By this arrangement the stock or handle being turned is continuously retained in contact with the cutters, not too rigidly, but yielding just enough to insure good work and produce an exact duplicate of the pattern or model.

Having thus described my invention, what I claim as new, and desire to secure by Letters Patent, is—

In a machine for turning irregular forms, the combination, with the angular levers $a\ a'$, crossed and pivoted together near their longitudinal center, of the weights $b\ b'$, attached to the lower ends of said levers, for the purpose of automatically retaining the upper ends of the same in a clamping position, the springs $d\ d'$, having one end connected to the lower part of the levers and the opposite ends to the frame-work, for the purpose of assisting in holding the levers in the required position, the angle-bracket $a^3$, forming the pivotal bearing for said levers, and the cross-bar $a^4$, supporting said bracket, all combined, arranged, and operating substantially as set forth.

NICHOLAS GEISEN.

Witnesses:
L. M. FREEMAN,
C. S. JONES,